Nov. 22, 1960 P. FREEMAN 2,960,722
AUTOMATIC WEB INDEXING AND CUT-OFF APPARATUS
FOR PLASTIC BLISTER FORMING MACHINE
Filed Jan. 5, 1960 2 Sheets-Sheet 1

INVENTOR.
PHILIP FREEMAN
BY Sanford Schumacher
ATTORNEY.

Nov. 22, 1960     P. FREEMAN     2,960,722
AUTOMATIC WEB INDEXING AND CUT-OFF APPARATUS
FOR PLASTIC BLISTER FORMING MACHINE

Filed Jan. 5, 1960     2 Sheets-Sheet 2

INVENTOR.
PHILIP FREEMAN
BY Sanford Schumacher
ATTORNEY.

United States Patent Office

2,960,722
Patented Nov. 22, 1960

2,960,722

AUTOMATIC WEB INDEXING AND CUT-OFF APPARATUS FOR PLASTIC BLISTER FORMING MACHINE

Philip Freeman, 1391 E. 33rd St., Cleveland 14, Ohio

Filed Jan. 5, 1960, Ser. No. 573

4 Claims. (Cl. 18—4)

This invention relates to machines for the forming of plastic blister containers from plastic sheet material in roll form, and particularly to apparatus for indexing and cutting off sections of the formed material.

Conducive to a better understanding of this invention, it may be well to point out that the packaging of industrial, automotive, hardware, and household items in so-called "blister packages" has become increasingly popular within the last four or five years. Such a package comprises a transparent plastic shell or "blister" formed to the half shape of the article to be packaged and mounted on a card-board backing over the contained article so that it is visible to the prospective user. An item so packaged is always clearly visible through the blister, while at the same time being protected from soil and physical damage until it reaches the ultimate consumer.

In the past it has been the practice to form such blisters from pre-cut thermo plastic sheets that were individually inserted by hand in a suitable vacuum forming machine, processed, and then removed therefrom, and a new sheet inserted. Even though a plurality of blisters could be formed from a single pre-cut sheet, the manual insertion and removal of the individual sheets was both time consuming and inefficient.

The primary object of this invention, therefore, is to provide a forming machine for thermo plastic materials that can function with a continuous web or roll of plastic material, instead of individual cut sheets.

Another object is to provide means for cyclically indexing sections of a web of plastic sheet material into a forming mold, removing and cutting off the formed section and simultaneously replacing same with a new unformed section.

Another object is to provide a device of the type stated having means for indexing sections of different lengths.

Still another object is to provide indexing and cutting means that can be easily adjusted to position the start of the indexing cycle at any point on the web within the physical limits between the minimum and maximum indexing pull.

A further object is to provide indexing apparatus that is so integrated with the blister forming cycle of its associated forming machine that it only functions at the end of the forming cycle.

Another object is to provide such a device that is rugged in structure, easy of adjustment and reliable in operation.

These and other objects of the invention will become apparent from a reading of the following specification and claims, together with the accompanying drawings, wherein like parts are referred to and indicated by like reference numerals, and wherein:

Figure 1:
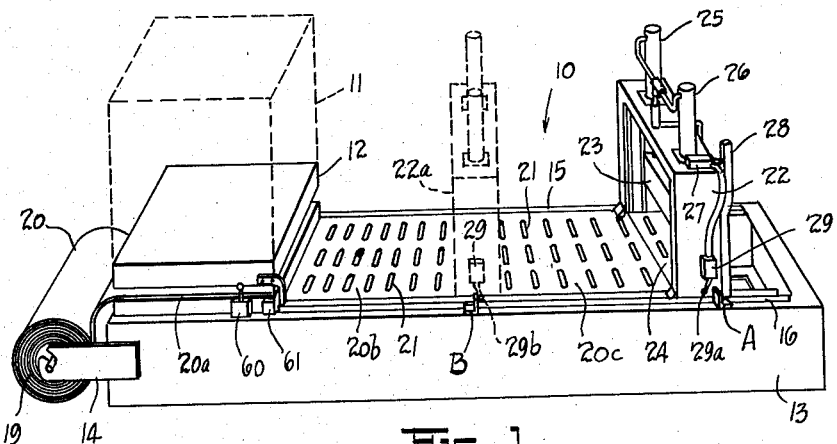
Figure 1 is a perspective view of the automatic indexing and cut-off apparatus that is the subject of this invention showing it integrated with the vacuum blister forming machine, with its indexing carriage in alternate positions.

Referring more particularly to the drawing, there is seen in Figure 1 the automatic web indexing and cut-off apparatus for plastic blister forming machines broadly indicated by reference numeral 10, as it appears integrated with a conventional vacuum forming machine 11. The machine 11 is shown in dotted outline, without details of its structure, since it forms no part of this invention, as such.

A forming machine, 11, of this type has a plurality of blister forming half molds positioned on a flat bed. A sheet of thermo-plastic material is placed over the molds and held in air-tight engagement with a rim surrounding the mold bed by a vertically movable clamp 12. The so held plastic sheet is heated by suitable means, such as an electric heater coil positioned above the sheet until a temperature is reached at which the sheet begins to soften and sag. At that point the sheet is pulled against the molds by a semi-vacuum created between the heat softened plastic sheet and the molds to form the blisters, after which the heat is turned off, the clamp 12 is raised and the formed sheet is free to be removed from the machine 11. The clamping, heating, forming and releasing stages are automatically initiated by an electric cycling circuit forming a part of the machine.

Reference numeral 13 indicates the frame of the automatic indexing and cut-off apparatus 10, upon one end of which the vacuum former 11 is mounted.

Two rails 15 and 16 are located near the side edges of the frame 13 and act as track-ways upon which the index carriage 22 rides. The carriage 22 has a bed 24 and upright side members between which a combined knife and clamp 23 is slidably mounted. The knife-clamp is of the usual type found on paper cutting machines in which the clamp element engages the bed 24 just ahead of the cutting blade.

The clamp-knife 23 is raised and lowered by two pneumatic cylinders 25 and 26 which are controlled by a two-way electrically operated valve 57.

Reference numeral 27 indicates a momentary-contact electric switch, of the so-called "micro-switch" type, which is operable by a vertically traveling post 28 that is attached to and movable with the knife-clamp 23.

Two spaced and parallel U-shaped rails 42 and 43 extend lengthwise of the frame 13 at the center line thereof.

An index head 37 is mounted on and between the rails 42 and 43.

The head 37 comprises a base block 38 slightly narrower than the space between the two rails.

Reference numerals 44 indicate four horizontally extending rollers journaled at each corner of the base block and adapted to ride on the top face of the rails 42 and 43.

Reference numerals 41 indicate four dependent rollers journaled at each corner of the underside of the base block and adapted to roll against the facing side edges of the apposed rails 42 and 43. Reference numerals 45 indicate a bottom plate, having a cut-out center portion 47, which is mounted in spaced relation to the underside of the base block 38 by means of four spacer-bolts 46. The plate 45 is wide enough to extend beyond the dependent edges of the rails 42 and 43, as seen most clearly in Figure 3, and just clear of the bottom edges thereof. Thus the index head 37 is free to roll longitudinally of the rails 42 and 43 on its rollers 44, while its rollers 41 prevent side-play and the bottom plate 45 prevents the head from being lifted vertically off the rails.

A crank arm follower wheel 39 is journaled in the top face of the base block 38 and a dependent chain peg 51 is mounted in the block in axial alignment with the crank arm follower 39.

Reference numeral 30 indicates a master pneumatic cylinder having a hydro-check 31 associated therewith in the usual manner to assure smooth operation. The piston rod 32 of the cylinder is connected at 34, in the manner of a third class lever, to a crank-arm 33 that is pivotally anchored on an angle iron 18 forming a part of the frame 13. The free end of the crank arm 33 has an elongated slot 36 with which the follower wheel 39 is engaged. Thus the index head 37 is directly connected to the crank arm 33 and is movable thereby longitudinally of the rails 42 and 43 between positions 37 and 37a as the crank arm pivots between the positions 33 and 33a, respectively, as seen in Figure 2.

Figure 2:
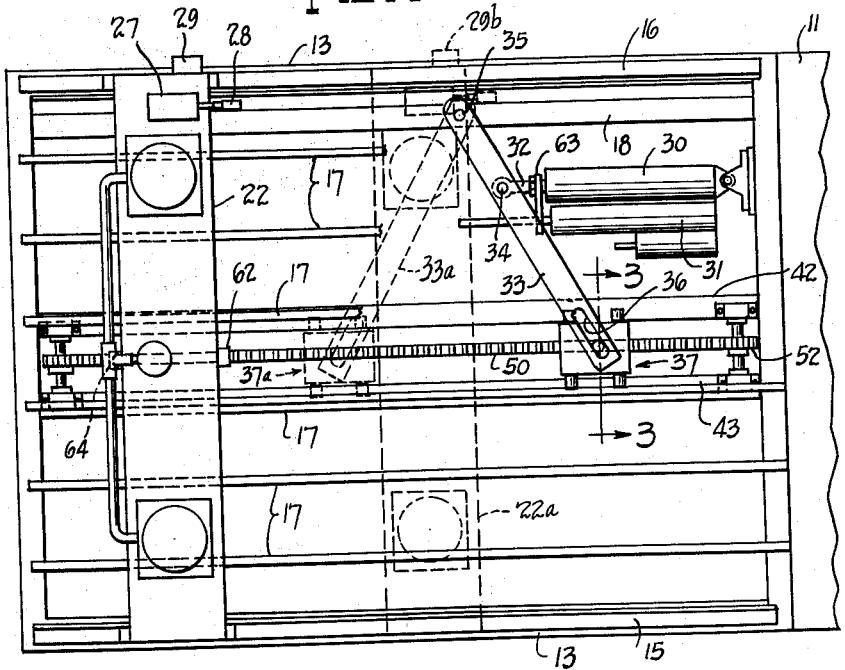
Figure 2 is a top plan view of the indexing apparatus showing the indexing carriage and associated indexing head in alternate positions.

A sprocket wheel 52 and 53 is journaled between the rails 42 and 43 at each end of the frame 13, as again seen in Figure 2.

A chain 50 is supported between said sprocket wheels 52 and 53 with its ends 62 and 64 anchored to either side of the index carriage 22.

Figure 3:
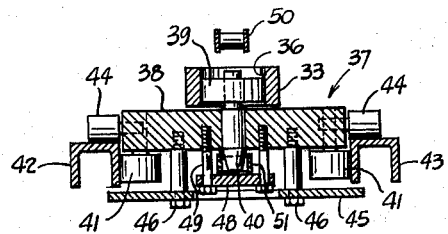
Figure 3 is a vertical cross-section through the indexing head taken along the line and in the direction of the arrows 3—3 of Figure 2.
Figure 4:
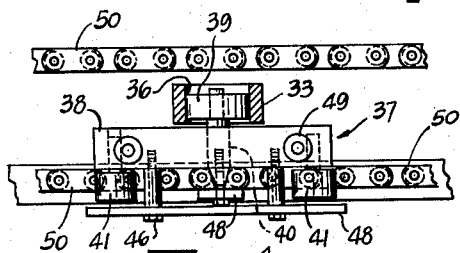
Figure 4 is a side view, partly in section taken along the line and in the direction of the arrows 4—4 of Figure 3.
Figure 5:
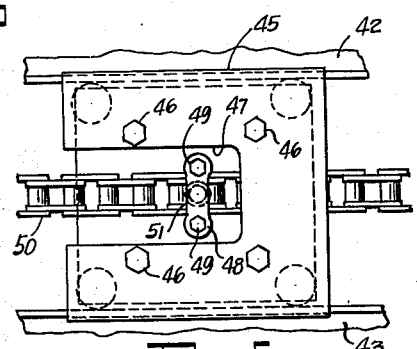
Figure 5 is a bottom plan view of the indexing head and chain.

The lower part of the chain 50 runs through the index head 37 below the base block 38 with one of its links 51 engaged by the pin or peg, 40, as seen in Figures 3 and 4.

A clamp 48 is held cross-wise of the chain 50, over the end of the peg 40, by two long bolts 49, whereby the chain 50 is locked to the index head 37.

It will be evident that the index head 37 moves to the left or away from the forming machine 11, as seen in Figure 2, the index carriage 22 will travel to the right toward the forming machine 11, and vice-versa.

Figure 6:
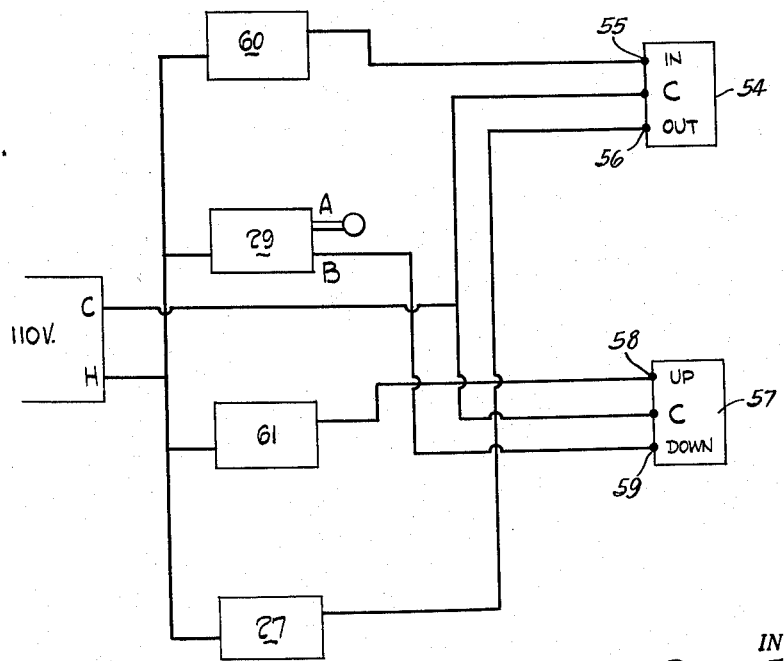
Figure 6 is a schematic layout of the electrical control circuits.

The master cylinder 30 and the clamp-knife cylinders 25 and 26 are controlled by two-way, magnetically operated valves identified by reference numerals 54 and 57, respectively, in the schematic electrical control layout, illustrated in Figure 6.

A plurality of spaced and parallel web guide rods 17 extend the length of the frame 13 between the forming machine 11 and the far end thereof, and act to support the hereinafter described web sections 20b and 20c above the chain 50.

Brackets 14 are positioned on the frame 13 on the far side of the forming machine 11, as seen in Figure 1.

The operation of the device is as follows:

A roll or web of plastic sheeting 19 of suitable physical and chemical characteristics is journaled between the brackets 14. The web is threaded through the forming machine 11 below the clamp 12 and over the support rods 17 with its free end held on the bed 24 of the index carriage 22 by the clamp-knife 23.

In order to clarify the procedure, the different portions of the web 19 have been identified by reference numerals 20, 20a, 20b and 20c. That portion of the web between the roll 19 and the forming machine 11 is identified by reference numeral 20. That portion within the machine 11, by numeral 20a; the first section of the web bearing formed blisters by numeral 20b; and the second section of the web bearing formed blisters, by 20c.

At the start of the blister forming cycle the clamp 12 comes down on the section 20a of the web and the various "blister" forming operations take place as outlined hereinabove. After the "blisters" have been formed on the web section 20a the clamp 12 rises. As it does so, the indexing and cut-off apparatus 10 that is the subject of this invention takes over. The rising clamp 12 trips the momentary-contact switch 60.

The following sequence of events can be most easily understood by referring to Figures 1 and 6 of the drawing. At the moment the switch 60 is tripped, the index carriage is at starting or first position 22a. The tripping of switch 60 activates the magnet 55 of air valve 54 of master cylinder 30 which causes the piston rod 32 to be pulled inwardly of the cylinder 30 until it hits the stop-collar 63, which moves the index head 37 toward the forming machine 11 and the index carriage 22 a predetermined distance away from its original position to move a new section of the web under the clamp 12.

As the carriage 22 reaches the end of its outward travel, or its second position, the momentary-contact switch 29 on the carriage 22 is tripped by a finger A mounted on the side of the frame 13. The circuit starts the blister forming cycle in the machine 11, causing the clamp 12 to come down on the web at 20a. There will now be two sections, 20b and 20c, having formed blisters thereon ahead of the new section 20a being processed.

As the clamp 12 closes, it trips the momentary-contact switch 61 which activates the magnet 58 of the valve 57 controlling the cylinders 25 and 26 which raises the clamp-knife 23. As the clamp rises, the rod 28 trips the momentary-contact switch 27 which activates the magnet 56 of master cylinder valve 54 which in turn causes the piston rod 32 to be extended to the maximum thereby swinging the crank arm 33 to the position 33a and moving the index head 37 to the position 37a. The section of the chain 50 attached to the carriage at 62 moves the carriage 22 in the opposite direction to return it to its starting position at 22a. When the carriage 22 is at the end of its return travel, its switch 29 is tripped by a second finger B to a second position 29b which activates magnet 59 of valve 57 to cause cylinders 25 and 26 to drop the knife-clamp 23 and cut off a section 20c of the web, bearing formed blisters 21. At the same time the clamp, clamps upon the cut end of the web section 20b. This releases the section 20c for removal by hand. The carriage remains in position 22a until the end of the blister forming cycle, when the opening of the clamp 12 trips the switch 60 to initiate the repetition of the indexing and cut-off cycle as set forth above.

The length of the web sections 20a, 20b and 20c will vary with the size and number of blisters to be simultaneously formed at each forming cycle. In order to provide economical operation, the starting point, or first position, 22a of the index carriage 22 must be varied with the length of the indexing pull. This is easily brought about with the present device by stopping the piston rod 32 at its position of maximum outward travel, whereat the crank arm assumes the position 33a with its attached index head at 37a. The index carriage will then be at the starting point of its indexing pull. This point can be varied toward or away from the forming machine clamp 12 within limits of one chain link by removing the clamp 48, disengaging the chain 50 from the peg 40 and manually moving the index carriage 22 along the rails 15 and 16 in either direction. As the carriage is moved the chain 50 passes beneath the stationary index head peg 40. When the carriage is at the desired starting point the chain 50 is again slipped over the peg 40 and locked in place by the clamp 48. The so engaged chain will always return the carriage to the identical starting point 22a when the piston rod 32 is fully extended.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a thermo plastic blister forming machine of the self-cycling type having a web holding clamp movable between a first web clamping position and a second web releasing position, automatic web indexing and cut-off apparatus, comprising, an elongated frame member adapted to support the blister forming machine at one end thereof and including a track aligned with the forming machine clamp and extending away therefrom; an indexing carriage mounted on the track and movable longitudinally thereof between a first position near the forming machine clamp and a second position far from said clamp; the carriage having a web supporting bed and a combined index clamp and cut-off knife movable vertically thereof between a first position wherein the clamp-knife presses upon the bed and a second position wherein it is above and clear of the bed; means for moving the indexing carriage between its first and second position when the forming machine clamp is in its second position, and means for moving the carriage between its second and first positions when the forming machine clamp is in its first position, and means for moving and holding the index carriage clamp-knife in its first or second position, when the index carriage is in its first or second position, respectively.

2. In combination with a thermo plastic blister forming machine of the self-cycling type having a web holding clamp movable between a first web clamping position and a second web releasing position, automatic web indexing and cut-off apparatus, comprising an elongated frame member adapted to support the blister forming machine at one end thereof, and including a first track aligned with the forming machine clamp and extending away therefrom; an index carriage mounted on the first track and movable longitudinally thereof between a first position near the forming machine clamp and a second position far from said clamp; the carriage having a web supporting bed and a combined index clamp and cut-off knife movable vertically thereof between a first position wherein the clamp-knife presses upon the bed and a second position wherein it is above and clear of the bed; a second track mounted on the frame member between the rails of the first track, an index head mounted on said second track and movable longitudinally thereof between first and second positions; a pneumatic cylinder mounted on the frame member having its piston rod connected to the index head, the rod being movable between a first, extended position, and a second, contracted position, the index head being in its first position when the piston rod is in its first position and in its second position when the piston rod is in its second position; an endless index chain mounted on the frame member between the rails of the second track and extending the length thereof above and below the index head, the upper section of the chain being attached to the index carriage, the lower section of the chain being adjustably secured to the index head, the interconnected piston rod, index head and chain operating to move the index carriage to its first position when the piston rod is in its first position, and to its second position when the piston rod is in its second position, said pneumatic cylinder having electrically operated valve means and control circuits therefor, operable by the forming machine clamp, to energise the piston rod thereof to move the piston rod between its first or second position when the forming machine clamp is in its first or second position respectively, and means for moving and holding the index carriage clamp-knife in its first or second position, when the index carriage is in its first or second position, respectively.

3. In combination with a thermo plastic blister forming machine of the self-cycling type having a web holding clamp movable between a first web clamping position and a second web releasing position, automatic web indexing and cut-off apparatus, comprising an elongated frame member adapted to support the blister forming machine at one end thereof, and including a first track aligned with the forming machine clamp and extending away therefrom; an index carriage mounted on the first track and movable longitudinally thereof between a first position near the forming machine clamp and a second position far from said clamp; the carriage having a web supporting bed and a combined index clamp and cut-off knife movable by pneumatic cylinders, between a first position wherein the clamp-knife presses upon the bed and a second position wherein it is positioned above and clear of the bed; a second track mounted on the frame member between the rails of the first track, an index head mounted on said second track and movable longitudinally thereof between first and second positions; a pneumatic cylinder mounted on the frame member having its piston rod connected to the index head, the rod being movable between a first, extended position, and a second, contracted position, the index head being in its first position when the piston rod is in its first position and in its second position when the piston rod is in its second position; an endless index chain mounted on the frame member between the rails of the second track and extending the length thereof above and below the index head, the upper sections of the chain being attached to the index carriage, the lower section of the chain being adjustably secured to the index head, the interconnected piston rod, index head and chain operating to move the index carriage to its first position when the piston rod is in its first position, and to its second position when the piston rod is in its second position, all of said pneumatic cylinders having electrically operated valve means and control circuits therefor, operable to energise the cylinders to cause the piston rods thereof to move between their first and second positions in a pre-determined sequence; and an electric cycling circuit controlled by the position of the forming machine clamp and acting to initiate the indexing and cut-off cycle when the said clamp moves into its second or web releasing, position.

4. A structure of the type defined in claim 3 and further distinguished by the index head comprising a rectangular base of a width to fit between the rails of the second track; two pairs of laterally extending rollers journaled on either side of the base and engaged with the top of the rails; two pairs of dependent rollers journaled on the lower face of the base proximate either side edge thereof and engageable with the side faces of the spaced rails; piston rod linking means mounted on the top face of the base; a dependent peg mounted on the lower face of the base, at the center thereof, the peg being of a size and shape to interfit one of the links of the index chain; a lock bar removably mounted on the underside of the base and spaced therefrom to clamp over the interfitted chain link and against the lower end of the peg; and, a guide plate mounted on the block below the dependent rollers engageable with the under side of the aforesaid rails to prevent vertical movement of the base.

References Cited in the file of this patent

UNITED STATES PATENTS

| 1,931,284 | Carlson | Oct. 17, 1933 |
| 2,469,299 | Hatfield | May 3, 1949 |
| 2,521,387 | Maynard et al. | Sept. 5, 1950 |
| 2,736,150 | Loew | Feb. 28, 1956 |
| 2,824,610 | Schubert et al. | Feb. 25, 1958 |